US012582900B2

(12) United States Patent
Chou et al.

(10) Patent No.: US 12,582,900 B2
(45) Date of Patent: Mar. 24, 2026

(54) ADJUSTABLE CENTER OF GRAVITY FOR A USER INPUT DEVICE OF AN INFORMATION HANDLING SYSTEM

(71) Applicant: Dell Products L.P., Round Rock, TX (US)

(72) Inventors: Yi-Ming Chou, Taipei City (TW); Chiu-Jung Tsen, Zhubei (TW); Wei-Hsiang Chi, Taipei (TW)

(73) Assignee: Dell Products L.P., Round Rock, TX (US)

( * ) Notice: Subject to any disclaimer, the term of this patent is extended or adjusted under 35 U.S.C. 154(b) by 388 days.

(21) Appl. No.: 18/150,744

(22) Filed: Jan. 5, 2023

(65) Prior Publication Data

US 2024/0226720 A1 Jul. 11, 2024

(51) Int. Cl.
| | |
|---|---|
| *A63F 13/24* | (2014.01) |
| *A63F 13/285* | (2014.01) |
| *A63F 13/818* | (2014.01) |
| *A63F 13/98* | (2014.01) |

(52) U.S. Cl.
CPC ............ *A63F 13/24* (2014.09); *A63F 13/285* (2014.09); *A63F 13/98* (2014.09); *A63F 13/818* (2014.09)

(58) Field of Classification Search
CPC ........ A63F 13/24; A63F 13/285; A63F 13/98; G06F 3/016
See application file for complete search history.

(56) References Cited

U.S. PATENT DOCUMENTS

2019/0212825 A1* 7/2019 Simmons ................ G06F 3/016

* cited by examiner

*Primary Examiner* — Yingchuan Zhang
(74) *Attorney, Agent, or Firm* — Norton Rose Fulbright US LLP

(57) ABSTRACT

This disclosure describes systems, devices, apparatuses, and methods of adjusting a center of gravity associated with a user device, such as a gaming controller. A movable weight may be moved to a first position associated with a first center of gravity of the user device and to a second position associated with a second center of gravity of the user device. The movable weight may be moved manually or automatically. The center of gravity may be adjusted based on a gameplay event or context or based on a user event or context. The user may receive feedback from an application via the user device.

19 Claims, 9 Drawing Sheets

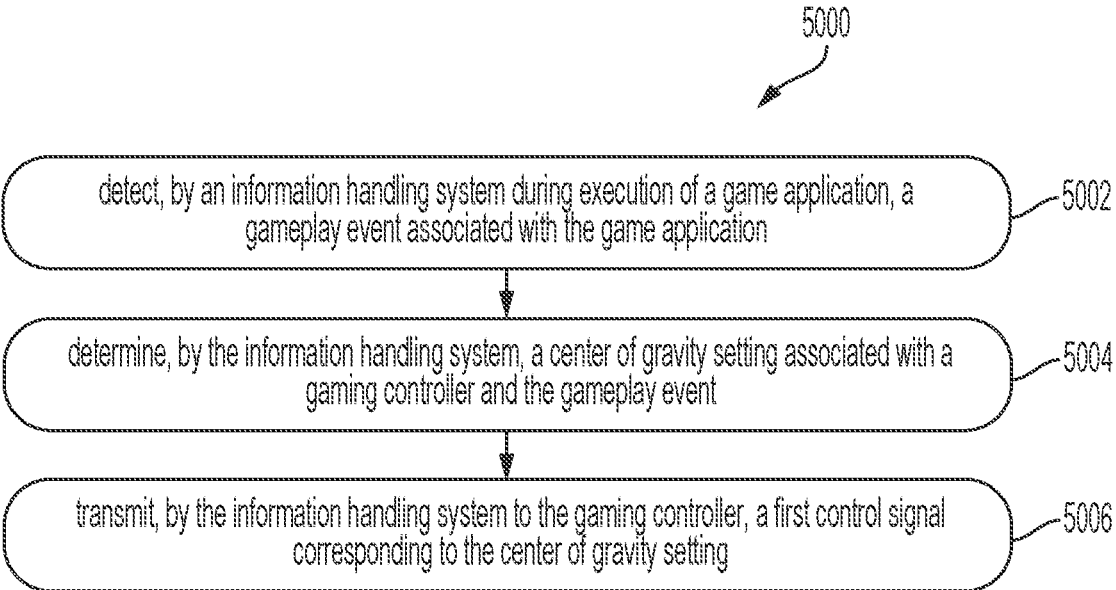

5000 detect, by an information handling system during execution of a game application, a gameplay event associated with the game application — 5002 determine, by the information handling system, a center of gravity setting associated with a gaming controller and the gameplay event — 5004 transmit, by the information handling system to the gaming controller, a first control signal corresponding to the center of gravity setting — 5006

FIG. 8

ADJUSTABLE CENTER OF GRAVITY FOR A USER INPUT DEVICE OF AN INFORMATION HANDLING SYSTEM

FIELD OF THE DISCLOSURE

The instant disclosure relates to user input devices and systems. More specifically, portions of this disclosure relate to an adjustable center of gravity for computer devices or other gaming systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A user may interact with information handling systems through hardware components configured as user input devices and software configured to process input from the user input devices. User input devices, including handheld videogame controllers, are used when operating various computer applications to enable users to provide input to operate various functions of the computer application. For example, a gaming controller can operate with a gaming device to enable a user to provide input into an application, such as a video game, to control an object or character, select audio or video content, or otherwise control aspects related to the gaming device. Thus, gaming controllers typically include multiple buttons, such as depressible buttons, pads, joysticks, triggers, or bumpers. The user may also receive feedback through the user input device. For example, the input device may give feedback from the application to the user based on a signal transmitted by the information handling system to the input device. The input device can, for example, apply a force, vibration, or motion in response to a game event.

SUMMARY

According to embodiments of this disclosure, a user input device, such as a gaming controller, may include an adjustable center of gravity. A movable weight may be moved to one or more positions to adjust the center of gravity. For example, the movable weight may be moved to a first position associated with a first center of gravity and to a second position associated with a second center of gravity.

The movable weight may be moved manually or automatically. For example, the movable weight may be manually removed from a first recessed pocket associated with the first center of gravity and inserted into a second recessed pocket associated with the second center of gravity. As another example, an electromagnet, a motor and gear rack, or a motorized pulley may be used to automatically move the movable weight from the first position to the second position, or vice versa. The center of gravity may be adjusted based on a gameplay event or context or based on a user event or context—and the user may receive feedback from the application via the user device. For example, while the user is playing a fishing game, the center of gravity may be adjusted towards a top of the gaming controller when a fish is caught, and the center of gravity may be adjusted towards a bottom of the gaming controller when the fish is pulled out of the water. As another example, the center of gravity may be adjusted based on the user's gaming position, such as whether the user is lying on a sofa or standing in front of a TV. The adjustable center of gravity enables application developers to offer more features to the user and to provide a more immersive experience to the user, which in turn may improve the user's performance and enjoyment when using the application.

In some embodiments, an apparatus may include a body configured to cover at least a portion of a gaming controller and a movable weight coupled to a portion of the body. In some embodiments, movement of the movable weight may be configured to adjust a center of gravity associated with the gaming controller.

In some embodiments, the apparatus may include a first recessed pocket on the body. In some embodiments, the apparatus may include a second recessed pocket on the body. In some embodiments, each recessed pocket may be configured to receive the movable weight to adjust the center of gravity associated with the gaming controller. In some embodiments, the apparatus may include a third recessed pocket on the body. In some embodiments, the recessed pockets may be along a first direction. In some embodiments, the first recessed pocket may be configured to be near a top of the gaming controller, the third recessed pocket may be configured to be near a bottom of the gaming controller, and the second recessed pocket may be between the first recessed pocket and the third recessed pocket.

In some embodiments, the apparatus may include a weight-moving mechanism coupled to the body and to the movable weight. In some embodiments, the weight-moving mechanism may be configured to move the movable weight to a first position. In some embodiments, the weight-moving mechanism may be configured to move the movable weight to a second position. In some embodiments, the first position may be associated with a first center of gravity of the gaming controller. In some embodiments, the second position may be associated with a second center of gravity of the gaming controller. In some embodiments, the weight-moving mechanism may be configured to adjust the center of gravity associated with the gaming controller to the first center of gravity by moving the movable weight to the first position. In some embodiments, the weight-moving mechanism may be configured to adjust the center of gravity associated with the gaming controller to the second center of gravity by moving the movable weight to the second position. In some embodiments, the weight-moving mechanism may include an electromagnet. In some embodiments, the weight-moving mechanism may include a motor and gear rack. In some embodiments, the weight-moving mechanism may include a motorized pulley. In some embodiments, the weight-moving mechanism may be configured to move the movable weight to a third position associated with a third center of gravity. In some embodiments, the positions may be along a first direction, such that the first position is configured to be near a top of the gaming controller, the third position is configured to be near a bottom of the gaming controller, and the second position is between the first position and the third position.

In some embodiments, the weight-moving mechanism may be configured to receive an input from an information handing system (IHS). In some embodiments, the weight-moving mechanism may be configured to move the movable weight to the first position when the input is a first input. In some embodiments, the weight-moving mechanism may be configured to move the movable weight to the second position when the input is a second input. In some configurations, the first input may correspond to a first gameplay event associated with a game application executed by the IHS. In some configurations, the second input may correspond to a second gameplay event associated with the game application executed by the IHS.

In some embodiments, the apparatus may include a gaming controller with an array of buttons, a printed circuit board coupling the buttons of the array of buttons, and a housing at least partially enclosing the printed circuit board. In some embodiments, the housing and the body may form a unitary structure, such that at least a portion of the buttons, a portion of the printed circuit board, a portion of the movable weight, and a portion of the weight-moving mechanism are enclosed by the unitary structure. In some embodiments, the apparatus may include a plurality of magnets coupled to the body. In some embodiments, the magnets may be configured to couple the body to the gaming controller.

In some embodiments, a gaming controller may include an array of buttons, a controller configured to communicate user input to the buttons of the array of buttons to an information handling system, a printed circuit board coupling the buttons of the array of buttons, a housing at least partially enclosing the printed circuit board, a body configured to cover at least a portion of the housing; and a movable weight coupled to a first portion of the body. In some embodiments, movement of the movable weight may be configured to adjust a center of gravity associated with the gaming controller.

In some embodiments, the gaming controller may include a first recessed pocket. In some embodiments, the gaming controller may include a second recessed pocket on the body. In some embodiments, each recessed pocket may be configured to receive the movable weight to adjust the center of gravity. In some embodiments, the gaming controller may include a third recessed pocked on the body. In some embodiments, the first recessed pocket, the second recessed pocket, and the third recessed pocket may be along a first direction. In some embodiments, the first recessed pocket may be configured to be near a top of the gaming controller, the third recessed pocket may be configured to be near a bottom of the gaming controller, and the second recessed pocket may be between the first recessed pocket and the third recessed pocket.

In some embodiments, the gaming controller may include a weight-moving mechanism coupled to the body and to the movable weight. In some embodiments, the weight-moving mechanism may be configured to move the movable weight to a first position. In some embodiments, the weight-moving mechanism may be configured to move the movable weight to a second position. In some embodiments, the first position may be associated with a first center of gravity of the gaming controller. In some embodiments, the second position may be associated with a second center of gravity of the gaming controller. In some embodiments, the weight-moving mechanism may be configured to adjust the center of gravity associated with the gaming controller to the first center of gravity by moving the movable weight to the first position. In some embodiments, the weight-moving mechanism may be configured to adjust the center of gravity associated with the gaming controller to the second center of gravity by moving the movable weight to the second position. In some embodiments, the weight-moving mechanism may be configured to move the movable weight to a third position associated with a third center of gravity of the gaming controller. In some embodiments, the positions may be along a first direction. In some embodiments, the first position may be configured to be near a top of the gaming controller, the third position may be configured to be near a bottom of the gaming controller, and the second position may be between the first position and the third position.

In some embodiments, the weight-moving mechanism may be configured to receive an input from an information handing system (IHS). In some embodiments, the weight-moving mechanism may be configured to move the movable weight to the first position when the input is a first input. In some embodiments, the weight-moving mechanism may be configured to move the movable weight to the second position when the input is a second input. In some embodiments, the first input may correspond to a first gameplay event associated with a game application executed by the IHS. In some embodiments, the second input may correspond to a second gameplay event associated with the game application.

Some embodiments may include detecting, by an information handling system during execution of a game application, a gameplay event associated with the game application. Some embodiments may include determining, by the information handling system, a center of gravity setting associated with a gaming controller and the gameplay event. Some embodiments may include transmitting, by the information handling system to the gaming controller, a first control signal corresponding to the center of gravity setting. Some embodiments may include determining, by the information handling system, one or more positions of a movable weight coupled to a weight-moving mechanism coupled to a cover of the gaming controller. In some embodiments, the one or more positions may be associated with the center of gravity setting. In some embodiments, the transmitting of the first control signal may correspond to one of the one or more positions of the movable weight.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed apparatus, system, and methods, reference is now made to the following descriptions taken in conjunction with the accompanying drawings.

FIG. 8 shows a flow diagram of an example of a method of operating an adjustable center of gravity according to some embodiments of the disclosure.

DETAILED DESCRIPTION

This disclosure describes systems, devices, apparatuses, and methods of adjusting a center of gravity. Users generally interact with an information handling system through hardware components configured as user input devices. The user may operate functions within the information handling system's application by using the user input device to provide input into the application. The user may also receive feedback from the application through the user input device. This two-way communication between the user and the system enables application developers to offer more features to the user and to provide a more immersive experience to the user, which in turn may improve the user's performance and enjoyment when using the application.

User input devices, such as handheld videogame controllers and keyboards, have a center of gravity that is determined by the weight and placement of its internal components (such as the weight and location of the battery) and cannot be easily or quickly adjusted after initial assembly. Shortcomings mentioned here are only representative and are included to highlight problems that the inventors have identified in existing user input devices and interaction with information handling systems and sought to improve upon. Aspects of the devices and systems described below may address some or all of the shortcomings as well as others known in the art. Aspects of the devices and systems described below may present other benefits than, and be used in other applications than, those described. User input devices with adjustable centers of gravity according to aspects of this disclosure allow user and game-driven customizations that provide an improved user experience when operating the user input device and when interacting with an information handling system.

Figure 1:
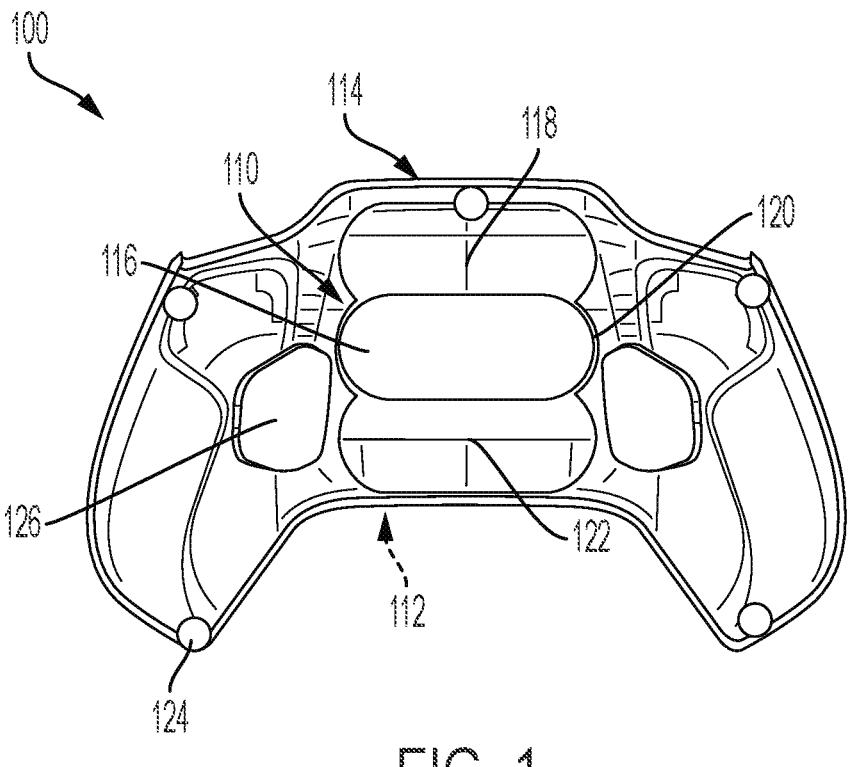
FIG. 1 is a front view of an example of a gaming controller cover according to some embodiments of the disclosure.

Referring to FIG. 1, shown is an example of a gaming controller cover 100 according to one or more aspects of the present disclosure. Gaming controller cover 100 includes a first cover portion 110, a second cover portion 112 (not pictured), a third cover portion 114, and a movable weight 116. In some configurations, gaming controller cover 100 can include—but need not include—one or more of a first recessed pocket 118, a second recessed pocket 120, and a third recessed pocket 122. In some configurations, gaming controller cover 100 can include—but need not include—one or more magnets 124 coupled to a body of gaming controller cover 100 and configured to couple the body of gaming controller cover 100 to the gaming controller to allow quick installation and removal of gaming controller cover 100 and enable manual movement of movable weight 116 to adjust the center of gravity. In some configurations, gaming controller cover 100 can include—but need not include—one or more openings 126 to allow one or more buttons of the gaming controller to protrude through the one or more openings 126.

The body of gaming controller cover 100 includes first cover portion 110, second cover portion 112, and third cover portion 114. First cover portion 110 is configured to be closer than second cover portion 112 to the portion of the gaming controller covered by the body of gaming controller cover 100, and third cover portion 114 is between first cover portion 110 and second cover portion 112. For example, first cover portion 110 may be a front surface of the body of gaming controller cover 100 that faces towards the gaming controller, second cover portion 112 may be a back surface of the body of gaming controller cover 100 that faces away from the gaming controller, and third cover portion 114 may be the portion of the body of gaming controller cover 100 between the front surface and the back surface of gaming controller cover 100. First cover portion 110, second cover portion 112, or third cover portion 114 may (each or all) extend the totality of the body of gaming controller cover 100, such that a perimeter of the body of gaming controller cover 100 coincides with a perimeter of first cover portion 110, a perimeter of second cover portion 112, or a perimeter of third cover portion 114. Alternatively, first cover portion 110, second cover portion 112, or third cover portion 114, may extend only a portion of the body of gaming controller cover 100. For example, first cover portion 110 may extend only the area where movable weight 116 is positioned—or the area where movable weight 116 is configured to be positioned. And first cover portion 110, second cover portion 112, and third cover portion 114 need not extend the same portion of the body of gaming controller cover 100. For example, first cover portion 110, second cover portion 112, and third cover portion 114 may all have different dimensions and shapes.

Movable weight 116 is coupled to the body of gaming controller cover 100. For example, movable weight 116 may be coupled to first cover portion 110. Movable weight 16 may be any material and may have any shape. Movable weight 16 need not be one single piece. Movable weight 16 may, for example, consist of multiple pieces coupled to each other or consist of multiple pieces individually coupled to the body of gaming controller cover 100. Movable weight 116 is configured to move to one or more positions relative to the body of gaming controller cover 100. Each position of movable weight 116 may be associated with a corresponding center of gravity of a gaming controller, such that movement of movable weight 116 to a position adjusts the center of gravity of the gaming controller to the center of gravity corresponding to the position. For example, the gaming controller's center of gravity may be adjusted to be near a top of the gaming controller when movable weight 116 is moved to a first position, near a center of the gaming controller when movable weight 116 is moved to a second position, or near a bottom of the gaming controller when movable weight 116 is moved to a third position.

In some configurations, gaming controller cover 100 can include—but need not include—one or more of a first recessed pocket 118, a second recessed pocket 120, and a third recessed pocket 122. For example, first recessed pocket 118, second recessed pocket 120, and third recessed pocket 122 may be on—or be part of—first cover portion 110. First recessed pocket 118, second recessed pocket 120, and third recessed pocket 122 are configured to receive movable weight 116. First recessed pocket 118, second recessed pocket 120, and third recessed pocket 122 may—but need not—be aligned along one direction. As shown on FIG. 1, first recessed pocket 118, second recessed pocket 120, and third recessed pocket 122 may be, for example, aligned along a direction extending from a bottom to a top of the body of gaming controller cover 100, such that first recessed pocket 118 is configured to be near a top of the gaming controller, third recessed pocket 122 is configured to be near a bottom of the gaming controller, and second recessed pocket 120 is between first recessed pocket 118 and the third recessed pocket 122.

Figure 2:
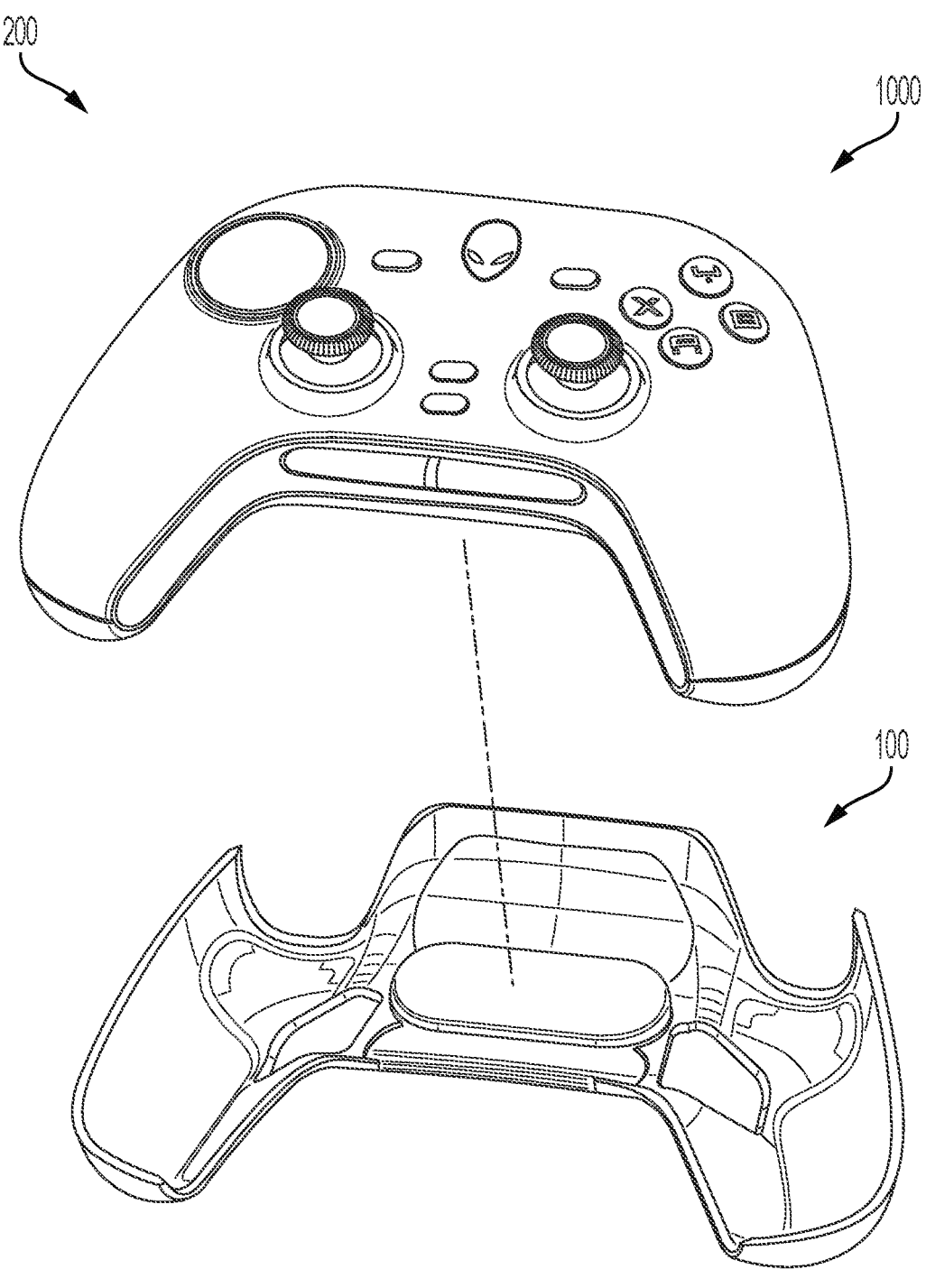
FIG. 2 is a perspective view of an example of a gaming controller according to some embodiments of the disclosure.

Referring now to FIG. 2, an example of a gaming controller 200 according to some embodiments of the disclosure is shown. Gaming controller 200 includes gaming controller 1000 and gaming controller cover 100. Gaming controller cover 100 may be, as shown, a separate structure configured to couple to a housing of gaming controller 1000, or the gaming controller cover 100 may form a unitary structure with the housing of gaming controller 1000. The unitary structure may be one piece molded together or two pieces (e.g., the housing of gaming controller 1000 being a front piece and the body of the gaming controller cover 100 being a back piece) coupled to each other and configured to enclose at least a portion of the buttons of gaming controller 1000, a portion of the printed circuit board of gaming controller 1000, and a portion of movable weight 116.

Figures 3A, 3B, 3C:
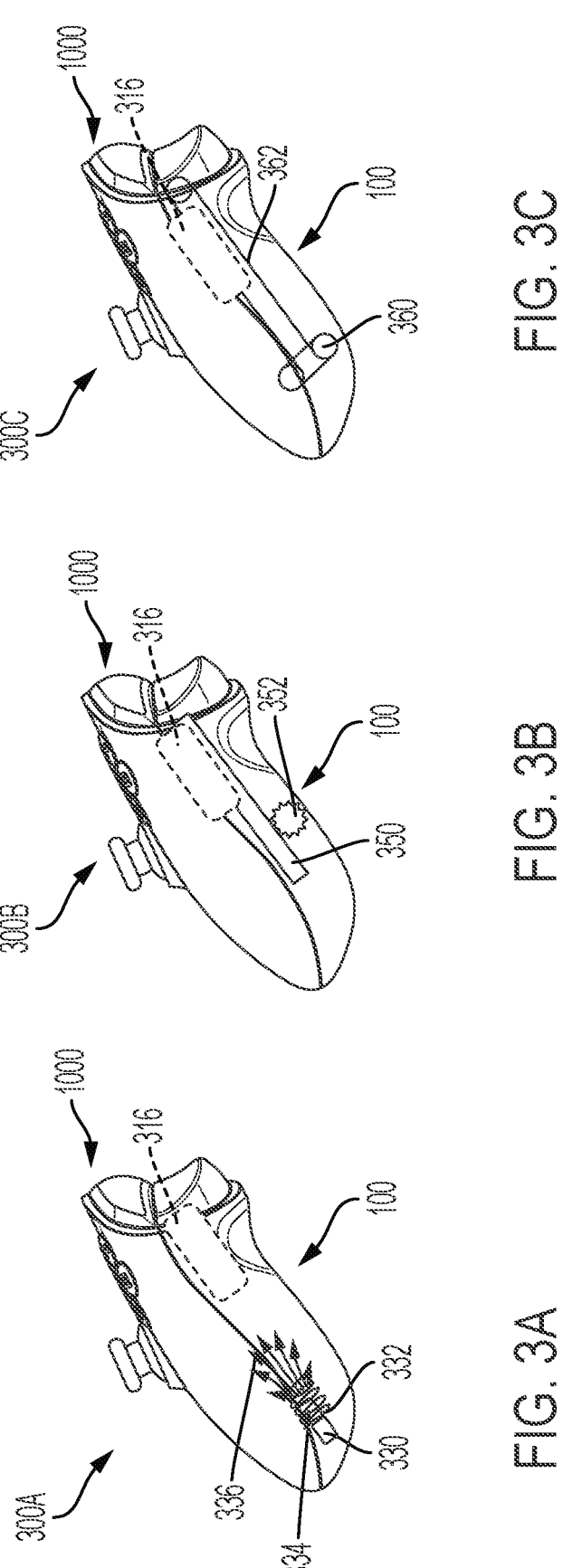
FIG. 3A is a side view of another example of a gaming controller according to some embodiments of the disclosure.
FIG. 3B is a side view of another example of a gaming controller according to some embodiments of the disclosure.
FIG. 3C is a side view of another example of a gaming controller according to some embodiments of the disclosure.

Referring now to FIGS. 3A, 3B, and 3C, three examples of a gaming controller (300A, 300B, and 300C, respectively) according to some embodiments of the disclosure are shown. Gaming controllers 300A, 300B, and 300C each include a gaming controller 1000, a gaming controller cover 100, a movable weight 316, and a weight-moving mechanism. The weight-moving mechanism is coupled to the body of the gaming controller cover 100 and to the movable weight 316. The weight-moving mechanism is configured to move movable weight 316 to one or more positions relative to the body of gaming controller cover 100. Each position of movable weight 316 may be associated with a corresponding center of gravity of the respective gaming controller (300A, 300B, or 300C), such that movement of movable weight 316 to a position adjusts the center of gravity of the gaming controller (300A, 300B, or 300C) to the center of gravity corresponding to the position. For example, the gaming controller's center of gravity may be adjusted to be near a top of the gaming controller when movable weight 316 is moved to a first position, near a center of the gaming controller when movable weight 316 is moved to a second position, or near a bottom of the gaming controller when movable weight 316 is moved to a third position.

As explained above and shown in FIGS. 3A, 3B, and 3C, the housing of gaming controller 1000 and the body of gaming controller cover 100 may form a unitary structure. In these figures, the unitary structure is made of two pieces (e.g., the housing of gaming controller 1000 being a front piece and the body of the gaming controller cover 100 being a back piece). The housing of gaming controller 1000 and the body of the gaming controller cover 100 are coupled to each other and configured to enclose at least a portion of the buttons of gaming controller 1000, a portion of the printed circuit board of gaming controller 1000, a portion of movable weight 316, and a portion of the weight-moving mechanism.

As shown in FIGS. 3A, 3B, and 3C, the weight-moving mechanism may include at least one of an electromagnet, a motor and gear rack, and a motorized pulley. The weight-moving mechanism of gaming controller 300A includes a support 330, a coil 332 at least partially wrapped around a magnetic core 334 coupled to support 330, and a controller (not pictured) coupled to coil 332. Magnetic core 334, the controller, and coil 332 are configured to create a magnetic field 336 that attracts or repels movable weight 316 or a support structure coupled to movable weight 316 to move movable weight 316 to one or more positions relative to the body of gaming controller cover 100. The weight-moving mechanism of gaming controller 300B includes a rack 350 coupled to a gear 352 and the movable weight 316 to move the movable weight 316 to one or more positions relative to the body of gaming controller cover 100. The weight-moving mechanism of gaming controller 300C includes one or more wheels 360 coupled to one or more strings 362, and at least one of the one or more strings is coupled to movable weight 316 to move movable weight 316 to one or more positions relative to the body of gaming controller cover 100.

Figure 4A:
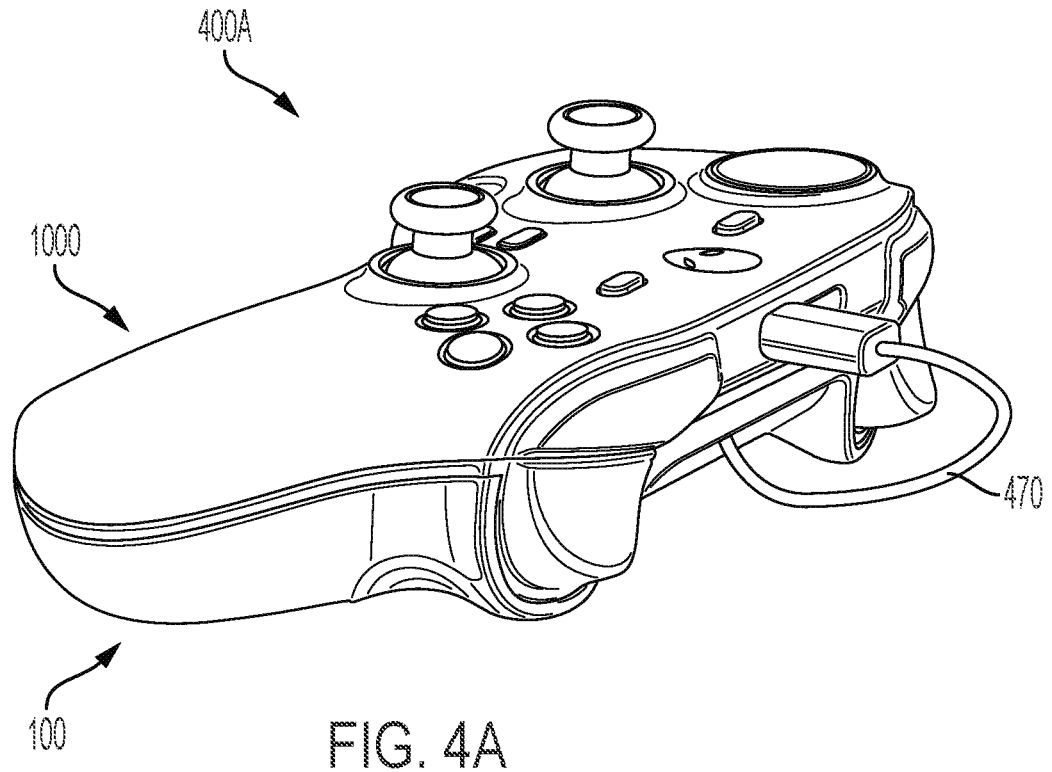
FIG. 4A is a perspective view of another example of a gaming controller according to some embodiments of the disclosure.
Figure 4B:
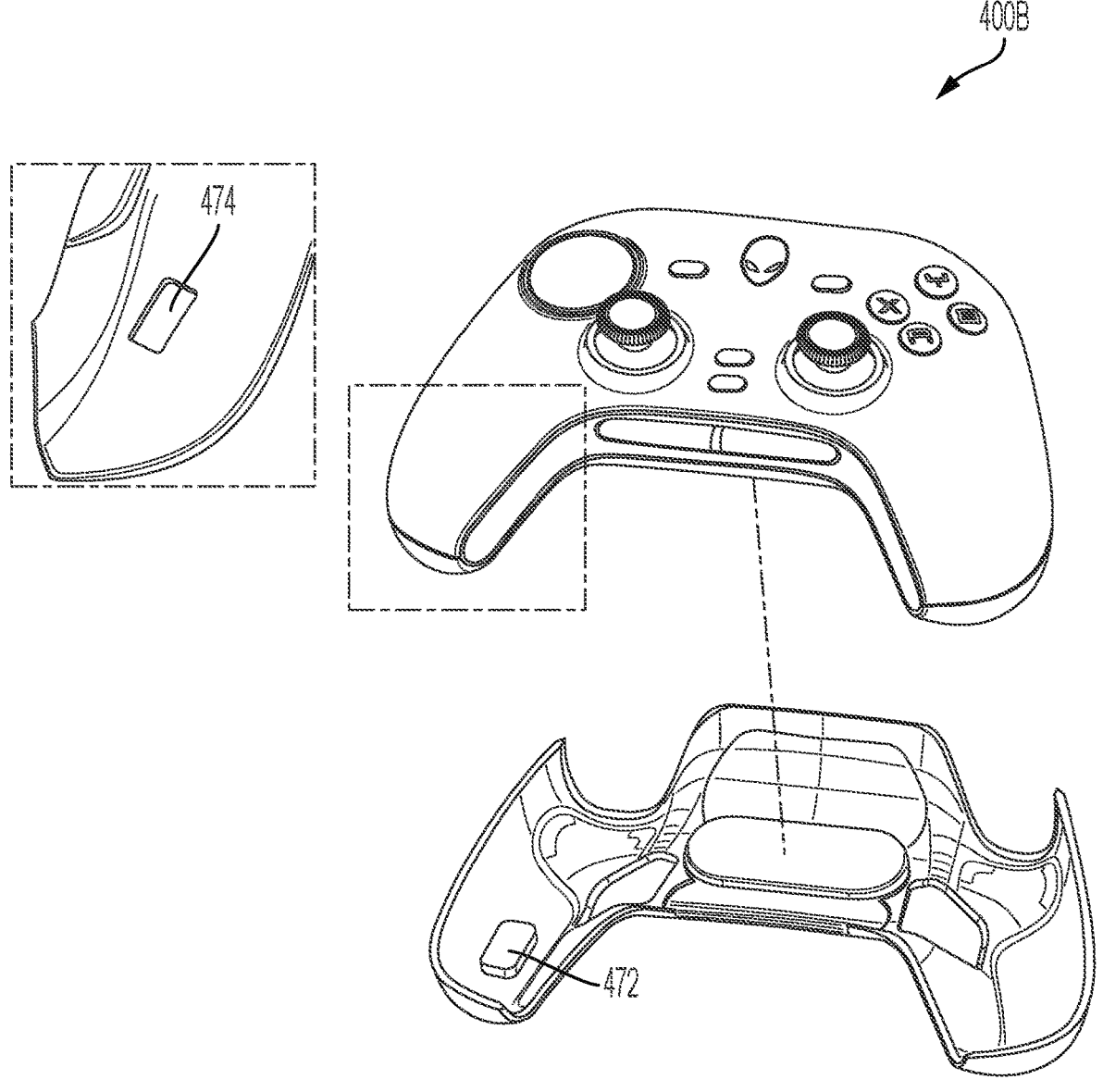
FIG. 4B is a perspective view of another example of a gaming controller according to some embodiments of the disclosure.

Referring now to FIGS. 4A and 4B, two examples of a gaming controller (400A and 400B, respectively) according to some embodiments of the disclosure are shown. As shown in these figures, in some configurations, the weight-moving mechanism of the gaming controller cover 100 may be coupled to a controller of the gaming controller 1000 via, for example, a USB-C 470 or a docking port 472.

Figures 5A, 5B, 5C:
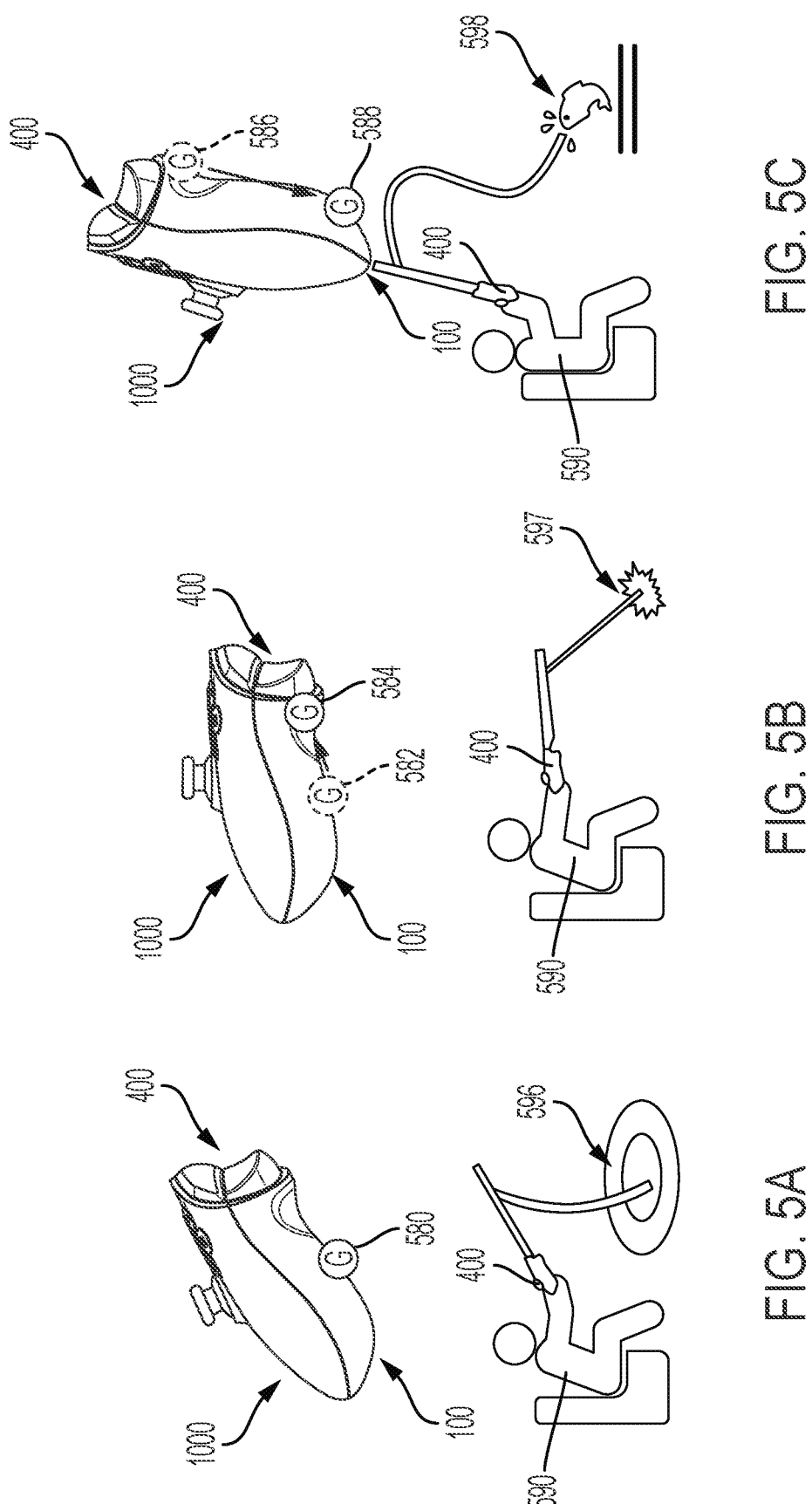
FIGS. 5A, 5B, and 5C are an illustration of an example of a method of operating an adjustable center of gravity according to some embodiments of the disclosure.

Referring now to FIGS. 5A, 5B, and 5C, an illustration of an example of a method of operating an adjustable center of gravity according to some embodiments of the disclosure is shown. The gaming controller's center of gravity may be adjusted based on a gameplay event or context or based on a user event or context—and the user may receive feedback from the application via the gaming controller. Below, FIGS. 5A, 5B, and 5C show a user (or virtual character) 590, a gaming controller (or virtual fishing rod) 400, and a gameplay event or context (e.g., 596, 597, or 598, respectively). Above, FIGS. 5A, 5B, and 5C show the gaming controller 400 (which includes gaming controller 1000 and gaming controller cover 100) and at least one center of gravity (e.g., 580, 582, 584, 586, and 588) associated with gaming controller 400. These centers of gravity may be associated to a position of a movable weight, such as movable weight 116 or 316 (not pictured), and may be associated to one or more gameplay event or context, such as those shown by 596, 597, or 598. In some embodiments, the moveable weight may be moved from a first position to a second position in response to a gameplay event or context (e.g., 596, 597, or 598) to adjust the gaming controller's center of gravity (e.g., 580, 582, 584, 586, 588) from a first center of gravity (e.g., 580, 582, 584, 586, 588) to a second center of gravity (e.g., 580, 582, 584, 586, 588). The adjustable center of gravity enables application developers to offer more features to the user and to provide a more immersive experience to the user, which in turn may improve the user's performance and enjoyment when using the application. In the examples shown on FIGS. 5A, 5B, and 5C, the center of gravity (e.g., 580, 582, 584, 586, 588) of gaming controller 400 may be adjusted in response to—or based on—a gameplay event or context 596, 597, or 598. For example, user 590 may be playing a fishing game. As shown in FIG. 5A, the user 590 may have started fishing and may be waiting for fish to appear (e.g., 596), so the movable weight may be moved to—or kept at—a first position (e.g., near a center of gaming controller cover 100) to adjust the center of gravity of gaming controller 400 to a first center of gravity near a center of the gaming controller 400, such as center of gravity 580. As shown in FIG. 5B, the user 590 may catch a fish (e.g., 297) and the fish in the application may begin pulling the fishing line, so the movable weight may be moved from a second position (e.g., near a center of gaming controller cover 100) to a third position (e.g., near a top of gaming controller cover 100) to adjust the center of gravity of gaming controller 400 from a second center of gravity near a center of the gaming controller 400, such as center of gravity 582, to a third center of gravity near a top of gaming controller 400, such as center of gravity 584. The movable weight's second position may correspond to the movable weight's first position, and the second center of gravity 582 may correspond to the first center of gravity 580. As shown in FIG. 5C, the user 590 may pull the fish out of the water (e.g., 598) and start carrying the fish, so the movable weight may be moved from a fourth position (e.g., near a top of gaming controller cover 100) to a fifth position (e.g., near a bottom of gaming controller cover 100) to adjust the center of gravity of gaming controller 400 from a fourth center of gravity near a top of gaming controller 400, such as center of gravity 586, to a fifth center of gravity near a bottom of gaming controller 400, such as center of gravity 588. The movable weight's fourth position may correspond to the movable weight's third position, and the fourth center of gravity 586 may correspond to the third center of gravity 584. As shown in these examples, the center of gravity of the gaming controller may be adjusted based on a gameplay event or context. The center of gravity may also be adjusted based on a user event or context, such as whether the user is lying on a sofa or standing in front of a TV.

Figure 6:
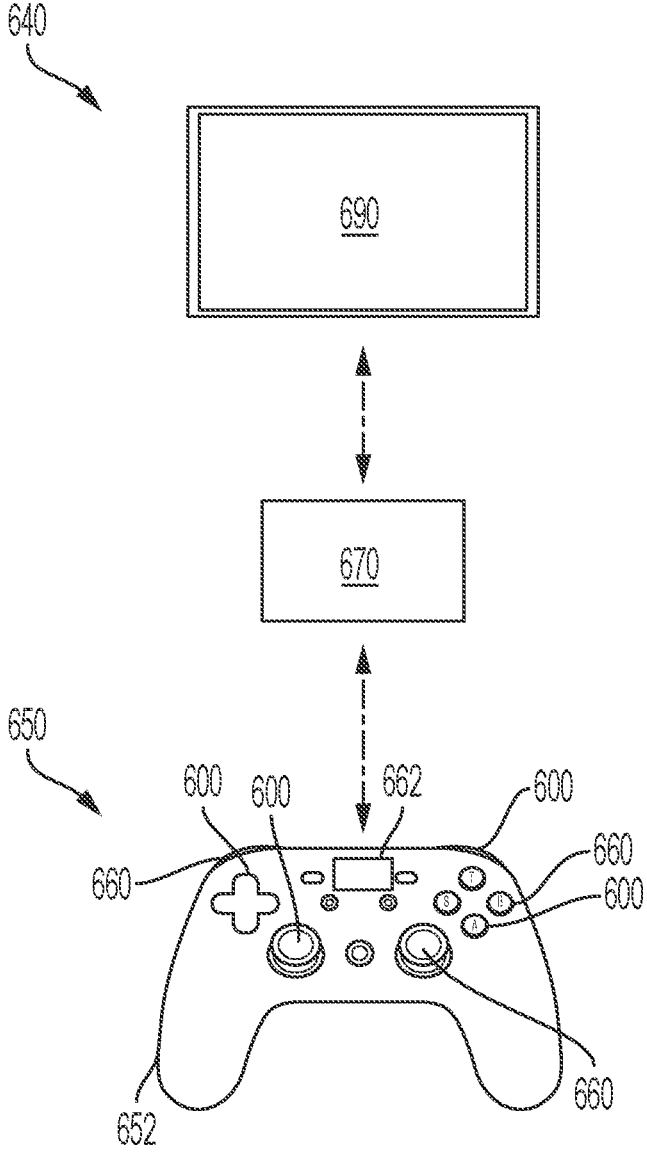
FIG. 6 is a schematic diagram of an example information handling system according to some embodiments of the disclosure.
Figure 7:
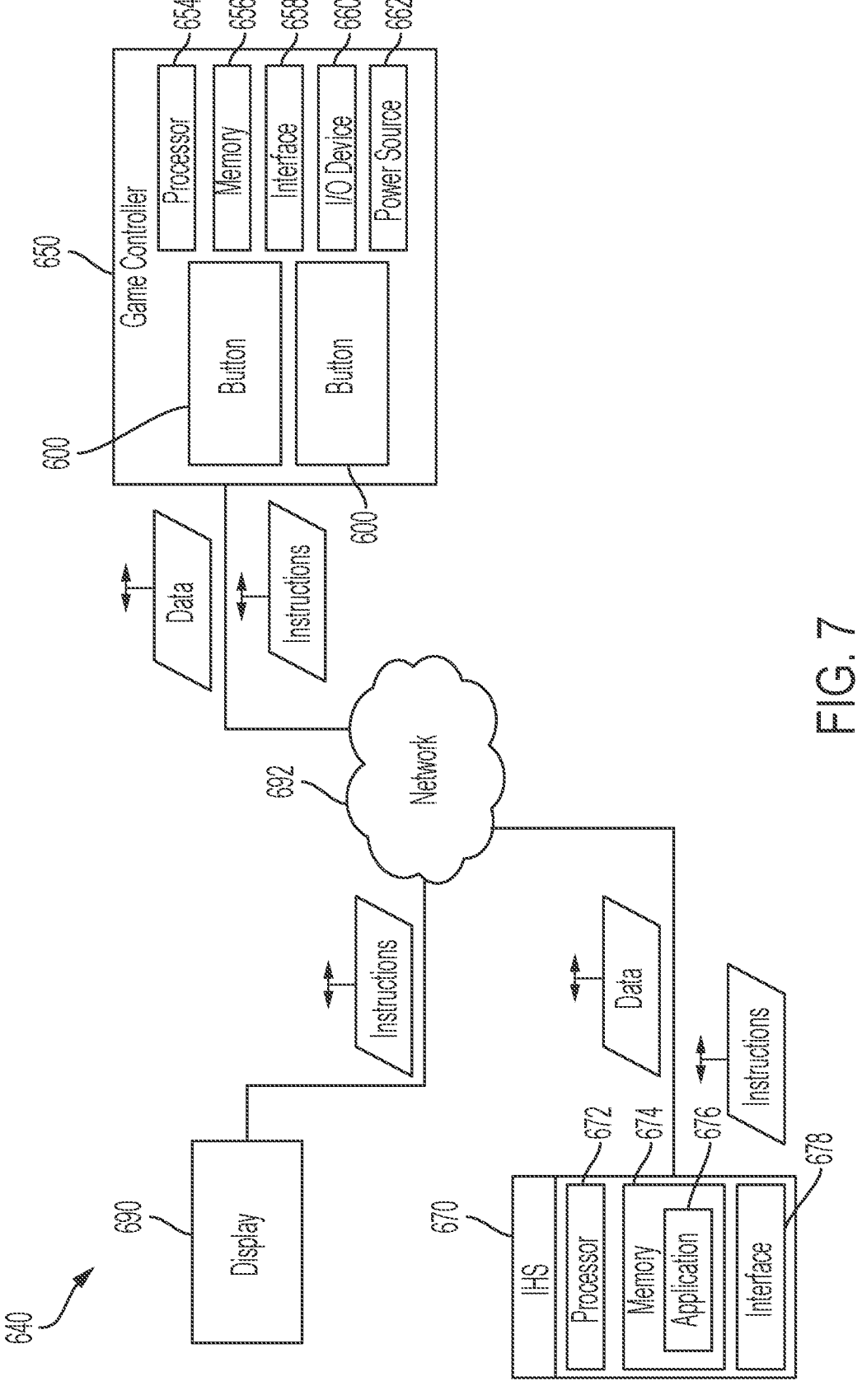
FIG. 7 is a block diagram of an example of the system of FIG. 6.

Referring now to FIGS. 6 and 7, an example information handling system according to some embodiments of the disclosure is shown. The system 640 includes one or more of a gaming controller 650, one or more of a display 690, and one or more of an information handling systems (IHS) 670 (e.g., video game console, entertainment console, personal computer, or other multimedia device) configured to execute one or more applications (e.g., video games). In some embodiments, the IHS 670 executing applications may be integrated with the display 690. In some configurations, the display 690 and the IHS 670 can be integrated with the gaming controller 650 as part of a mobile computing system or other information handling system such that the applications are executed at the gaming controller 650.

The gaming controller 650 is in communication with the IHS 670 (e.g., wired or wireless communication) and is configured to send and receive signals (e.g., user input signal, feedback signal) with the external device to navigate or otherwise control the applications. For example, as shown in FIG. 6, the gaming controller 650 is a video game controller, the IHS 670 is a gaming console, and the display 690 is a television. In some such configurations, the various devices of the system 640 (e.g., the gaming controller 650, the IHS 670, and the display 690) may be communicatively coupled to each other via one or more of a network 692 (e.g., a Bluetooth personal area network (PAN), an Ethernet local area network (LAN), a wireless local area network, a wide area network (WAN), or other network).

The gaming controller 650 can include a controller casing 652 (e.g., shell, housing) that defines an interior cavity configured to at least partially accommodate one or more of the buttons 600, one or more of an input-output device 660, or other components of the gaming controller 650. The gaming controller 650 may be—or may include one or more of the features of—any of gaming controllers 200, 300A, 300B, 300C, 400, 400A, and 400B. For example, the gaming controller 650 may include a gaming controller cover (e.g., 100) coupled to casing 652 and a movable weight (e.g., 116, 316) coupled to the gaming controller cover. For example, the gaming controller 650 may include also a weight-moving mechanism coupled to the movable weight and to the gaming controller cover and configured to adjust a center of gravity associated with gaming controller 650 by moving the movable weight to one or more positions relative to the gaming controller cover.

As shown in FIG. 7, the gaming controller 650 may include a processor 654, a memory 656, an interface 658, an input-output (I/O) device 660, a power source 662, or a combination of these components. The gaming controller 650 in FIGS. 6 and 7 need not include all the components shown and may include additional components.

The processor 654 may be a central processing unit (CPU) or other computing circuitry (e.g., a microcontroller, one or more application specific integrated circuits (ASICs), or the like) and may have one or more processing cores. The processor 654 may be configured to couple to the weight-moving mechanism and to move the movable weight to one or more positions to adjust a center of gravity associated with gaming controller 650. Additionally, or alternatively, the processor 654 may for example, execute a first profile or instruction that moves the movable weight to a first position to adjust the center of gravity of gaming controller 650 to a first center of gravity. And, for example, the processor 654 may execute a second profile or instruction that moves the moveable weight to a second position to adjust the center of gravity of gaming controller 650 to a second center of gravity. As yet another example, the processor 654 may execute a third profile or instruction that moves the moveable weight to a third position to adjust the center of gravity of gaming controller 650 to a third center of gravity. The first, second, and third positions may be aligned along a first direction. And the first, second, and third centers of gravity may correspond to a center of gravity near a top, near a center, and near a bottom of gaming controller 650, respectively. The movable weight's one or more positions may be associated to one or more configurations of the weight-moving mechanism.

The memory 656 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 656 may store instructions that, when executed by the processor 654, cause the processor 654 to perform the operations in connection with the gaming controller 650. Additionally, the memory 656 may store one or more profiles, thresholds, data, preferences, or other settings. For example, the memory 656 may store a first profile or instruction that when executed by the processor moves the movable weight to a first position to adjust the center of gravity of gaming controller 650 to a first center of gravity. And, for example, the memory 656 may store a second profile or instruction that when executed by the processor moves the moveable weight to a second position to adjust the center of gravity of gaming controller 650 to a second center of gravity. As yet another example, the memory 656 may store a third profile or instruction that when executed by the processor moves the moveable weight to a third position to adjust the center of gravity of gaming controller 650 to a third center of gravity. The movable weight's one or more positions may be associated to one or more configurations of the weight-moving mechanism.

The interface 658 may be configured to enable wireless communication between the gaming controller 650 and the IHS 670, communication between the gaming controller 650 and the display 690, or both. In some implementations, the interface 658 may include a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, another type of network interface, or the like.

The I/O device 660 may include, for example, one or more buttons (e.g., depressible buttons, triggers, joysticks, pads, bumpers, or the like), one or more touchscreens, one or more microphones, one or more cameras, one or more speakers, one or more light sources, one or more vibration devices, or any other device that enables a user to receive information from the gaming controller 650 or provide information to the gaming controller 650.

The IHS 670 is configured to support and operate one or more electronic applications (e.g., 676), such as a video game, video streaming platform, music streaming platform, or other media platform. The IHS 670 is referred to broadly and includes any suitable processor-based device such as, for example, a video game console, a hand-held console, a desktop computer, a laptop computer, a mobile computing device, a tablet, a digital media, or entertainment device, or any other type of electronic device. The IHS 670 may include at least a processor 672, a memory 674, and an interface 678. The interface 678 may be configured to enable communication between the IHS 670 and the gaming controller 650, communication between the IHS 670 and the display 690, or both. The processor 672 may be configured to execute instructions stored at the memory 674 to cause the IHS 670 to perform the operations described here. In some implementations, the IHS 670 can be configured to access a wireless network or the internet (e.g., via an application on the IHS 670) or to access a web application or web service hosted by a server, and thereby provide a user interface for enabling a user to access an application 676.

In some configurations, the IHS 670 is configured to act as an intermediary between the gaming controller 650 and the display 690. For example, the IHS 670 may receive a user input from the gaming controller 650 (e.g., at the button 600) and transmit and/or process the user input to the display 690 to change the displayed environment (e.g., navigation between icons, rotating a point of view of a character, select a visual prompt, or otherwise changing the display environment). In some configurations, the IHS 670 is configured to send instructions (e.g., signals) to the gaming controller 650 to transmit information to the user. For example, based on a programmable setting of the application 676, the IHS 670 may transmit one or more instructions to cause a movable weight to move to one or more positions to adjust a center of gravity associated with gaming controller 650. Additionally, or alternatively, the application 676 may cause the IHS 670 to transmit instructions to the gaming controller 650 to cause a movable weight to move to one or more positions to adjust a center of gravity associated with gaming controller 650. For example, the application 676 may allow a user to control a character in a gaming environment. The character may be, for example, fishing. When the character starts fishing and is waiting for fish to appear, the IHS 870 and/or the application 876 can determine that the gaming controller's center of gravity should be near a center of the gaming controller. Based on this determination, the IHS 870 and/or the application 876 can transmit a signal to the gaming controller 650 to move the movable weight to a first position to adjust the center of gravity of gaming controller 650 to a first center of gravity near a center of the gaming controller 650. When the character catches a fish and the fish begins pulling the fishing line, the IHS 870 and/or the application 876 can determine that the gaming controller's center of gravity should be near a top of the gaming controller. Based on this determination, the IHS 870 and/or the application

876 can transmit a signal to the gaming controller 650 to move the movable weight to a second position to adjust the center of gravity of gaming controller 650 to a second center of gravity near a top of the gaming controller 650. When the character pulls the fish out of the water and starts carrying the fish, the IHS 870 and/or the application 876 can determine that the gaming controller's center of gravity should be near a bottom of the gaming controller. Based on this determination, the IHS 870 and/or the application 876 can transmit a signal to the gaming controller 650 to move the movable weight to a third position to adjust the center of gravity of gaming controller 650 to a third center of gravity near a bottom of the gaming controller 650. In other words, the IHS 870 and/or the application 876 can transmit a signal to the gaming controller 650 in response to a gameplay event, for example, to communicate to a user that a certain condition in the game has changed or to give the user a more realistic feel based on the gameplay event or context. The IHS 870 and/or the application 876 may also make determinations based on a user event or context. For example, the IHS 870 and/or the application 876 may determine that the center of gravity should be adjusted based on whether the user is sitting or standing. Based on this determination, the IHS 870 and/or the application 876 can transmit a signal to the gaming controller 650 to move the movable weight—or to keep the movable weight at—a position that adjusts or maintains the center of gravity of gaming controller 650 to the determined center of gravity. Moreover, the user may choose the gaming controller's center of gravity, the movable weight's position, or the weight-moving mechanism's configuration. In this way and others, the system 640 and gaming controller 650 may enable application developers to include a more immersive experience by providing more feedback to the users.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Referring now to FIG. 8, shown is an example of a method of operating an adjustable center of gravity according to some embodiments of the disclosure. The method 5000 may be performed at, by, or with IHS 670 and a gaming controller (e.g., 650, 200, 300A, 300B, 300C, 400, 400A, and 400B, or a gaming controller with one or more of the components of any of these). The method 5000 includes a block 5002: detect, by an information handling system during execution of a game application, a gameplay event associated with the game application. The method 5000 further includes a block 5004: determine, by the information handling system, a center of gravity setting associated with a gaming controller and the gameplay event. The method 5000 further includes a block 5006: transmit, by the information handling system to the gaming controller, a first control signal corresponding to the center of gravity setting.

In some configurations, the method 5000 can include—but need not include—a block: determine, by the information handling system, one or more positions of a movable weight coupled to a weight-moving mechanism coupled to a cover of the gaming controller, wherein the one or more positions are associated with the center of gravity setting, and wherein the transmitting of the first control signal corresponds to one of the one or more positions of the movable weight.

The schematic flow chart diagram of FIG. 8 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuity may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a body having a first cover portion, a second cover portion, and a third cover portion, and configured to cover at least a portion of a gaming controller, the first cover portion having a first recessed pocket and a second recessed pocket and configured to be closer to the gaming controller than the second cover portion and the third cover portion, wherein the first recessed pocket and the second recessed pocket are recessed with respect to a perimeter of the first cover portion, and wherein the body is configured to couple to and detach from the gaming controller; and
   a movable weight coupled to the first cover portion of the body, wherein movement of the movable weight is configured to adjust a center of gravity associated with the gaming controller, wherein each recessed pocket is configured to receive the movable weight to adjust the center of gravity associated with the gaming controller.

2. The apparatus of claim 1, further comprising a third recessed pocket on the first cover portion, wherein the recessed pockets are along a first direction, such that the first recessed pocket is configured to be near a top of the gaming controller, the third recessed pocket is configured to be near a bottom of the gaming controller, and the second recessed pocket is between the first recessed pocket and the third recessed pocket.

3. The apparatus of claim 1, further comprising a weight-moving mechanism coupled to the body and to the movable weight, wherein the weight-moving mechanism is configured to move the movable weight to a first position and a second position, wherein the first position is associated with a first center of gravity of the gaming controller and the second position is associated with a second center of gravity of the gaming controller, and wherein the weight-moving mechanism is configured to adjust the center of gravity associated with the gaming controller to the first center of gravity by moving the movable weight to the first position and to the second center of gravity by moving the movable weight to the second position.

4. The apparatus of claim 3, wherein the weight-moving mechanism comprises at least one of an electromagnet, a motor and gear rack, or a motorized pulley.

5. The apparatus of claim 3, wherein the weight-moving mechanism is further configured to move the movable weight to a third position associated with a third center of gravity, wherein the positions are along a first direction, such that the first position is configured to be near a top of the gaming controller, the third position is configured to be near a bottom of the gaming controller, and the second position is between the first position and the third position.

6. The apparatus of claim 3, wherein the weight-moving mechanism is configured to receive an input from an information handing system (IHS) and to move the movable weight to the first position when the input is a first input and to the second position when the input is a second input.

7. The apparatus of claim 6, wherein the first input corresponds to a first gameplay event associated with a game application executed by the IHS and the second input corresponds to a second gameplay event associated with the game application.

8. The apparatus of claim 3, the gaming controller further comprising an array of buttons, a printed circuit board coupling the buttons of the array of buttons, and a housing at least partially enclosing the printed circuit board.

9. The apparatus of claim 8, wherein the housing and the body form a unitary structure, such that at least a portion of the buttons, a portion of the printed circuit board, a portion of the movable weight, and a portion of the weight-moving mechanism are enclosed by the unitary structure.

10. The apparatus of claim 1, further comprising a plurality of magnets coupled to the body and configured to couple the body to the gaming controller.

11. The apparatus of claim 1, wherein the first cover portion, the second cover portion, and the third cover portion extend a totality of the body such that a perimeter of the body aligns with a perimeter of the first cover portion, a perimeter of the second cover portion, and a perimeter of a third cover portion.

12. A gaming controller, comprising:
   an array of buttons;
   a controller configured to communicate user input to the buttons of the array of buttons to an information handling system;
   a printed circuit board coupling the buttons of the array of buttons;
   a housing at least partially enclosing the printed circuit board;
   a body having a first cover portion, a second cover portion, and a third cover portion, and configured to cover at least a portion of the housing, the first cover portion having a first recessed pocket and a second recessed pocket and configured to be closer to the housing than the second cover portion and the third cover portion, wherein the first recessed pocket and the second recessed pocket are recessed with respect to a perimeter of the first cover portion, and wherein the body is configured to couple to and detach from the gaming controller; and a movable weight coupled to the first cover portion of the body, wherein movement of the movable weight is configured to adjust a center of gravity associated with the gaming controller, wherein each recessed pocket is configured to receive the movable weight to adjust the center of gravity.

13. The gaming controller of claim 12, further comprising a third recessed pocket on the first cover portion, wherein the first recessed pocket, the second recessed pocket, and the third recessed pocket are along a first direction, such that the first recessed pocket is configured to be near a top of the gaming controller, the third recessed pocket is configured to be near a bottom of the gaming controller, and the second recessed pocket is between the first recessed pocket and the third recessed pocket.

14. The gaming controller of claim 12, further comprising a weight-moving mechanism coupled to the body and to the movable weight, wherein the weight-moving mechanism is configured to move the movable weight to a first position and a second position, wherein the first position is associated with a first center of gravity of the gaming controller and the second position is associated with a second center of gravity of the gaming controller, and wherein the weight-moving mechanism is configured to adjust the center of gravity associated with the gaming controller to the first center of gravity by moving the movable weight to the first position and to the second center of gravity by moving the movable weight to the second position.

15. The gaming controller of claim 14, wherein the weight-moving mechanism is further configured to move the movable weight to a third position associated with a third center of gravity of the gaming controller, wherein the positions are along a first direction, such that the first position is configured to be near a top of the gaming controller, the third position is configured to be near a bottom of the gaming controller, and the second position is between the first position and the third position.

16. The gaming controller of claim 14, wherein the weight-moving mechanism is configured to receive an input from an information handing system (IHS) and to move the movable weight to the first position when the input is a first input and to the second position when the input is a second input.

17. The gaming controller of claim 16, wherein the first input corresponds to a first gameplay event associated with a game application executed by the IHS and the second input corresponds to a second gameplay event associated with the game application.

18. A method, comprising:

detecting, by an information handling system during execution of a game application, a gameplay event associated with the game application;

determining, by the information handling system, a center of gravity setting associated with a gaming controller and the gameplay event, the gaming controller comprising a body having a first cover portion, a second cover portion, and a third cover portion, the body covering at least a portion of the gaming controller, wherein the first cover portion has a first recessed pocket and a second recessed pocket, wherein the first cover portion is situated closer to the gaming controller than the second cover portion and the third cover portion, and wherein the first recessed pocket and the second recessed pocket are recessed with respect to a perimeter of the first cover portion, and wherein the body is configured to couple to and detach from the gaming controller; and transmitting, by the information handling system to the gaming controller, a first control signal corresponding to the center of gravity setting, wherein each recessed pocket is configured to receive a movable weight to adjust a center of gravity associated with the gaming controller based on the first control signal.

19. The method of claim 18, further comprising determining, by the information handling system, one or more positions of the movable weight coupled to a weight-moving mechanism coupled to the first cover portion of the gaming controller, wherein the one or more positions are associated with the center of gravity setting, and wherein the transmitting of the first control signal corresponds to one of the one or more positions of the movable weight.

* * * * *